United States Patent [19]

Kjellberg et al.

[11] 3,800,916
[45] Apr. 2, 1974

[54] LOCKING MECHANISM FOR SETS OF CASTORS SUPPORTING APPARATUSES, MACHINES, OR FURNITURE

[75] Inventors: Finn André Kjellberg; Svend Edvard Nielsen Lemvig; Bent Ivan Kjellberg, all of Ronne, Denmark

[73] Assignee: Trioteam A/S, Ronne, Denmark

[22] Filed: Nov. 14, 1972

[21] Appl. No.: 306,298

[52] U.S. Cl. .................. 188/1 D, 188/20, 188/29
[51] Int. Cl. ............................................. B60t 1/04
[58] Field of Search ............ 16/30; 188/1 D, 20, 29

[56] References Cited
UNITED STATES PATENTS

| | | | |
|---|---|---|---|
| 3,479,681 | 11/1969 | Maslow | 188/1 D X |
| 3,532,188 | 10/1970 | Kelz | 188/29 X |
| 2,591,524 | 4/1952 | Douglas et al. | 188/20 |

Primary Examiner—Duane A. Reger
Attorney, Agent, or Firm—Harold L. Stowell

[57] ABSTRACT

A locking mechanism for sets of castors supporting apparatuses, machines or furniture is described, in which mechanism each wheel is mounted in a fork being rotatable around a tubular carrier fastened to a supporting frame for the apparatus, machine or piece of furniture, each of the tubular wheel carriers enclosing in sliding fit a tubular part of a locking member, which is movable up and down, but not revolving in the wheel carrier, and which at its underside carries a brake flange which can be brought to bear either against the wheel or, if desired, against the wheel fork to prevent it from revolving, whereas the locking members are pairwise operated by means of a lever system being designed as a toggle press.

6 Claims, 1 Drawing Figure

PATENTED APR 2 1974 3,800,916
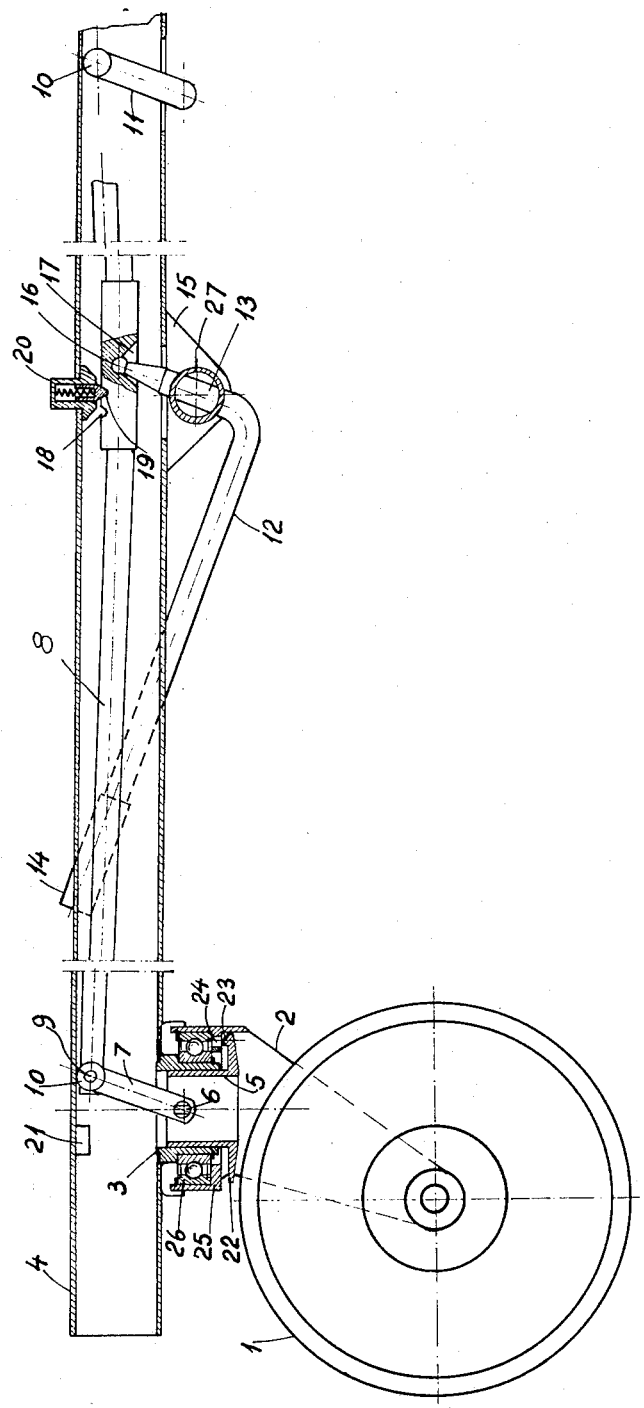

LOCKING MECHANISM FOR SETS OF CASTORS SUPPORTING APPARATUSES, MACHINES, OR FURNITURE

This invention relates to a locking mechanism for sets of castors supporting apparatuses, machines or furniture, in which mechanism each wheel is mounted in a fork being rotatable around a tubular carrier fastened to a supporting frame for the apparatus or piece of furniture.

The locking mechanism has been developed particularly for use on hospital beds on wheels and will be described in the following in connection with said use, but it can be used just as well with other heavy furniture, machines or apparatuses, which have to be transported occasionally from one place to another on a substantially level surface, and the said supporting frame may be a separate unit or form an integrating part of the piece of furniture, the machine or the apparatus.

The object of the invention is to provide a locking mechanism which is composed from simple and sturdy parts, and which is adapted to operate on one or more sets of wheels in such manner that starting from a nonlocking position it can lock a pair of wheel forks in a desired driving position or, if desired, it can lock both the forks and wheels.

According to the invention this object is attained by each of the tubular wheel carriers enclosing in sliding fit a tubular part of a locking member which is movable up and down, but not revolving in the wheel carrier, and which at its underside carries a brake flange which can be brought to bear either against the wheel or, if desired, against the wheel fork to prevent it from revolving, whereas the locking members are pairwise operated by means of a lever system being designed as a toggle press.

Thus the individual locking member is vertically movable between two extreme positions. In the lower position its braking surface is brought to bear against the wear surface of the wheel and thun locks the latter. Since the locking member cannot revolve in the wheel carrier, the fork will also be locked with this position of the locking member. The latter is appropriately fitted with a circular flange at the lower rim of its tubular part having a slightly conical bottom surface with a brake lining, since the prongs of the wheel fork are not vertical but have a slightly sloping position.

In the upper position of the locking member, the upper surface of its brake flange bears against an annular part of the wheel fork enclosing the wheel carrier and thus locks the wheel fork while the wheel is left free to rotate. Since fairly big revolving stresses may occur on the wheel forks, when the bed is pushed, the upper surface of the brake flange is provided, at least on one pair of wheels, with one or more pins fitting into corresponding recesses in the annular part of the wheel fork to form a sort of dog clutch.

In the centre position of the locking member both wheels and wheel forks are free to revolve.

In a preferred embodiment of the locking mechanism of the invention, the lever system acting upon the locking members of a pair of wheels consists of a short, nearly vertical lever at each wheel, one end of which lever is pivotally engaged by a pivot or rod being horizontally mounted in the tubular part of the locking member, whereas the other ends of such short levers are pivotally connected each with one end of a connecting rod being movable in its own longitudinal direction, a roller being mounted at or adjacent to each of the thus established toggle links, said roller running upon a bottom surface of the supporting frame carrying the wheels.

In this manner, a strong brake reinforcing effect is attained so that a relatively feeble force acting to move the connecting rod in its longitudinal direction is transformed into a heavy pressure of the locking member against the wear surface of the wheel. The pivots or rods in the tubular parts of the locking member may at the same time be utilized for securing the locking member against revolving, by providing said pivots with extensions projecting from the outer circumference of the tubular parts of the locking members, said extensions engaging corresponding vertical grooves in the cylindrical inner surface of the tubular wheel carriers.

It is further expedient, according to the invention, that the connecting rod in the lever system is slightly arcuated and mounted with a resilient prestressing. This stabilizes the lever system as a whole, the rollers at the ends of the connecting rod being steadily pressed against their rollway on the supporting frame with a force corresponding to the prestressing of the connecting rod.

Further, this may result in the lever system according to the invention being self-locking in the locking position by the short levers being able to swing shortly beyond the vertical position to come to rest against stops.

According to the invention, a brake lever or foot pedal shaped as a bell crank lever pivotally engaging the connecting rod is arranged to longitudinally move the latter and further, according to the invention, a spring-loaded lock is fixed in the supporting frame cooperating with notches or recesses in the connecting rod to retain the latter in a desired, not locking position. Thus, the locking system is prevented from inadvertant functioning, since, a certain, even if feeble, initial force has to be exerted, before the connecting rod starts to move.

At hospital beds, it is generally advantageous that the pair of wheels at the head can be locked independently of the locking of the pair of wheels at the foot board, a brake lever or foot pedal being provided at each end. However, it may be desirable to lock both pairs of wheels from one place, and this may be arranged, according to an embodiment of the invention, by mutually connecting the brake levers or foot pedals of the connecting rods for simultaneous operation of the locking members of all wheels.

In a preferred embodiment of the locking mechanism according to the invention, the supporting frame is made from tubular rods of square or rectangular cross section, and the connecting rods are enclosed by these tubular rods. This is appropriate partly because cleaning is far easier, when the movable parts of the locking system are thus enclosed, partly because it eliminates the risk of the bed linen being caught by the rods, and also because the bed gets a more inviting look, when the locking system is thus hidden.

The accompanying drawing illustrates in a partly sectional view an embodiment of the locking mechanism of the invention.

A wheel 1 is mounted in a wheel fork 2, which can revolve around a tubular wheel carrier 3. The latter is fastened to a tubular rod 4 forming part of a supporting frame made from metal tubes of square or rectangular cross section.

The wheel carrier 3 encloses slidingly fitting a tubular part of a locking member 5 with a through-going pin 6, the ends of which project a short way from each side of the locking member and engage grooves in the cylindrical inner surface of the wheel carrier 3, which grooves follow generatrices of said inner surface.

The pin 6 serves as a pivot for one end of a short manoeuvering rod 7 for the locking member 5. The other end of the rod 7 is pivotally connected to a connecting or brake rod 8 by means of a pin 9 carrying a roller 10.

The other end of the rod 8 is correspondingly connected to a manoeuvering rod 11 for the locking member of another wheel, corresponding to the rod 7.

The rod 8 is enclosed in the tubular rod 4 and is longitudinally movable by means of a brake lever or pedal 14 fashioned as a bell crank lever with a long and a short arm, 12 and 13 respectively, the short arm 13 being pivotally mounted, adjacent to the angular bend of the lever, in a bearing 15 on the underside of the tubular rod 4. The short arm 13 terminates in a ball 16 fitting into a cup-shaped recess 17 in the underside of the rod 8. Opposite the recess 17, the rod 8 has a series of notches or recesses 18, with which the tie bolt 19 of a spring-loaded lock 20, mounted in the tubular rod 4, may engage to fix the rod 8 in a desired position.

As shown, the connecting rod 8 is slightly arcuated downwards and has been given a resilient prestressing by means of the pressure of the short arm 13 of the pedal 14, thus keeping the rollers 10 pressed against the underside of the tubular rod 4.

A stop 21 limits the longitudinal movement of the rod 8.

As shown, the locking member 5 at the bottom has an outward projecting flange 22 with a slightly conical underside. The latter is made rough or provided with some sort of brake lining. On the upper side of the flange, one or several pins 23 are provided for engagement with corresponding holes 24 in the annular part 25 of the fork 2, which annular part encloses the wheel carrier 3, a ball bearing 26 being mounted between the two, if desired.

In the drawing, the connecting or brake rod 8 is shown in a centre position, being kept here by a spring-loaded lock 20. The locking member 5 is then inactive. By pushing the pedal 14 down, the rod 8 is moved to the left in the Figure. This moves the rod 7 to a vertical position, resulting in the locking member 5 being pressed down, its rough or brake-lined surface on the underside of the flange 22 coming to rest against the wear surface of the wheel 1, so that the wheel becomes blocked. At the same time, however, the wheel fork 2 is blocked against revolving around the wheel carrier 3, since the tubular part of the locking member 5 cannot revolve in, but is only longitudinally movable in the wheel carrier. The wheel fork is thus only able to revolve if the brake lining slides upon the wear surface of the wheel.

As shown, the stop 21 is placed so that the rod 7 may move to a little beyond the vertical position, which results in the locking mechanism being self-locking in the locking position owing to the resilient prestressing of the system.

If the foot pedal 14 is lifted or pressed upwards from the position shown in the Figure, instead of being pushed down, the rod 8 is moved to the right, and the rod 7 will then draw the locking member 5 upward, until the pin or pins 23 engage the annular part 25 of the fork 2. This locks the fork against revolving and holds it in the desired drive position.

On a hospital bed it may be appropriate to have a locking mechanism as the one illustrated at both the head and foot board, each having its foot pedal 14. The two pedals may then be coupled together by means of a shaft or tubular rod as indicated by 27 in the drawing, so that the locking members on all four wheels may be operated at one time from both ends of the bed. If the lockimg members 5 on both pairs of wheels are designed for locking the wheel forks 2, a releasable coupling may be fitted into the rod 27 so that one pair of wheels are locked in the drive position, while the other pair of wheels is free to revolve.

What is claimed is:

1. In a locking mechanism for sets of castors of the kind, in which the castor wheel is journalled in a fork being able to revolve on a tubular wheel carrier, the improvement which consists in
    each of the tubular wheel carriers enclosing a tubular part of a locking member, slidingly fitting into the tubular wheel carrier,
    said tubular part of the locking member being able to move up and down, but not to revolve in said tubular part of the wheel carrier,
    the tubular part of the locking member carrying a brake flange at the underside which can be brought to bear against the wear surface of the castor wheel in one extreme position of the movement of the locking member, and against the wheel fork in the other extreme position to prevent the latter from revolving,
    the locking members being pairwise served by means of a lever system being designed as a toggle press, wherein the lever system acting on a pair of castors comprises
    a short, nearly vertical lever at each castor wheel, one end of said lever being pivotable on a pivot horizontally mounted in the tubular part of the locking member,
    a connecting rod between the other ends of said short vertical levers and pivotably connected to said ends of the short levers being movable in its longitudinal direction, and
    a roller being mounted adjacent each of the thus established toggle links,
    said rollers having runways on the bottom side of a frame carrying the castors.

2. A locking mechanism according to claim 1, in which the connecting rod of the lever system is slightly arcuated and mounted with a resilient prestressing.

3. A locking mechanism according to claim 1, in which the lever system is self-locking in the locking position by the short levers being able to swing shortly beyond the vertical position to come to rest against a stop.

4. A locking mechanism according to claim 1, in which a spring-loaded lock cooperates with notches or similar recesses in the connecting rod to retain the latter in a desired, not locking position.

5. A locking mechanism according to claim 1, in which a brake lever or foot pedal shaped as a bell crank lever pivotally engaging the connecting rod is arranged to longitudinally move the connecting rod.

6. A locking mechanism according to claim 1, in which the brake levers or foot pedals of the connecting rods are mutually connected for simultaneous operation of the locking members of all wheels.

* * * * *

UNITED STATES PATENT OFFICE
CERTIFICATE OF CORRECTION

Patent No. 3,800,916     Dated April 2, 1974

Inventor(s) FINN ANDRE KJELLBERG; SVEND EDVARD NIELSEN LEMVIG; BENT IVAN KJELLBERG It is certified that error appears in the above-identified patent and that said Letters Patent are hereby corrected as shown below:

Foreign Application Priority Data

November 23, 1971   Denmark . . . . . 5726/71

Signed and sealed this 6th day of August 1974.

(SEAL)
Attest:

McCOY M. GIBSON, JR.
Attesting Officer

C. MARSHALL DANN
Commissioner of Patents